Jan. 5, 1971　　　　G. D. McGOOGAN ET AL　　　3,552,174
STOCK PUSHING APPARATUS AND METHOD
Filed Dec. 7, 1967　　　　　　　　　　　　　5 Sheets-Sheet 1
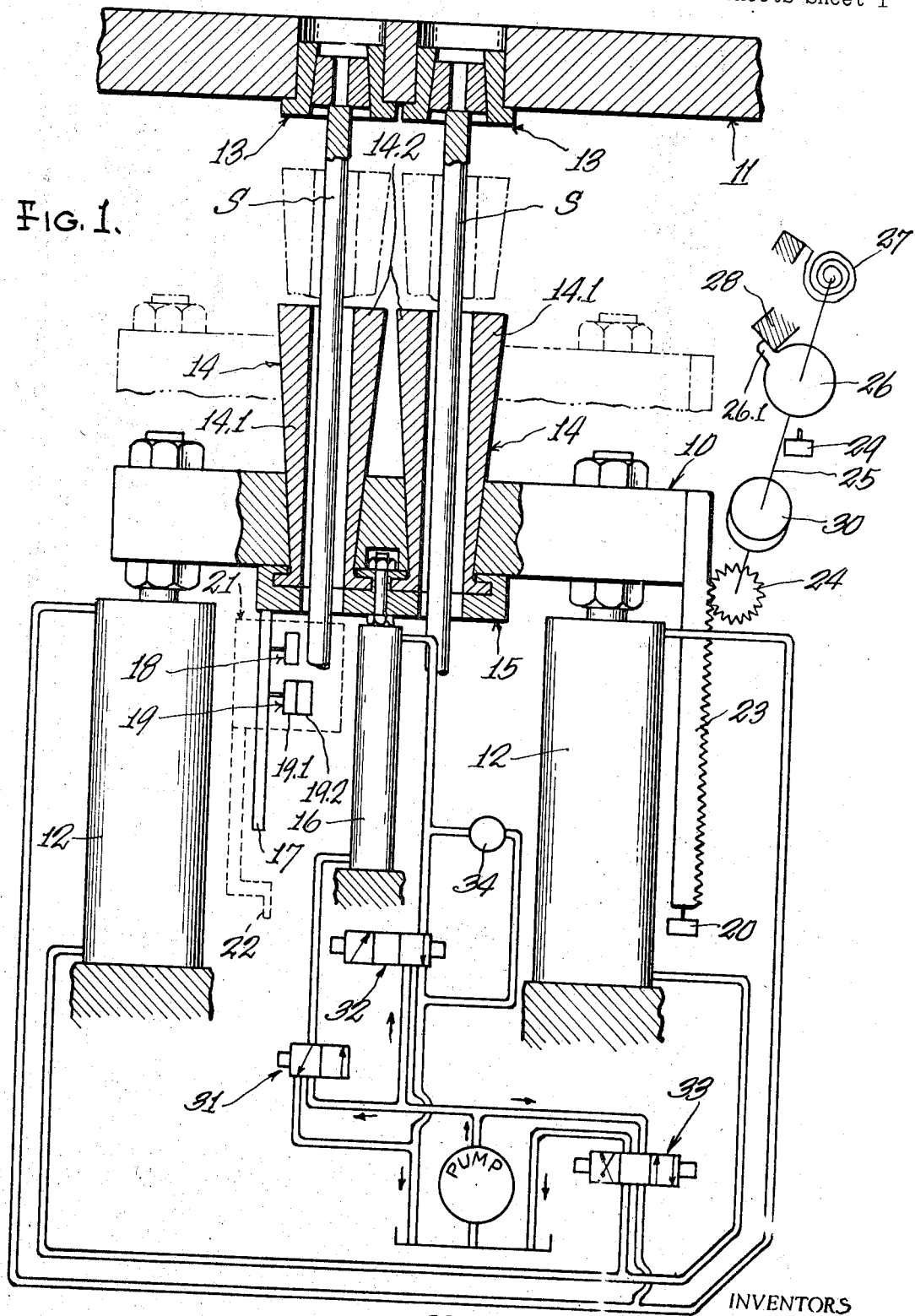
INVENTORS
GEORGE D. McGOOGAN; PAUL D. NOBLE
JOSEPH L. SHULTZ & FLOYD W. DIEHL
By Williams and Kassks
ATTORNEYS

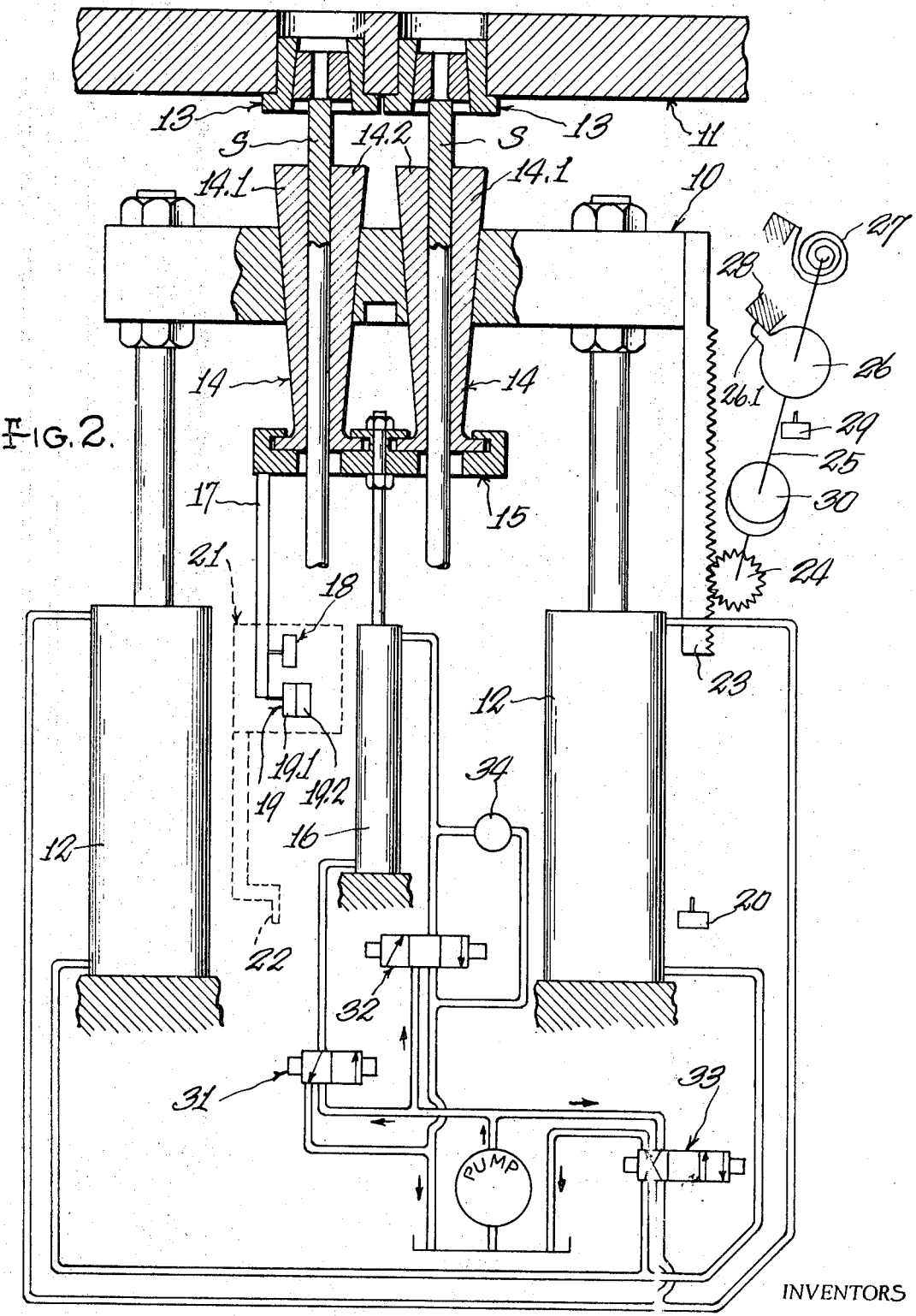

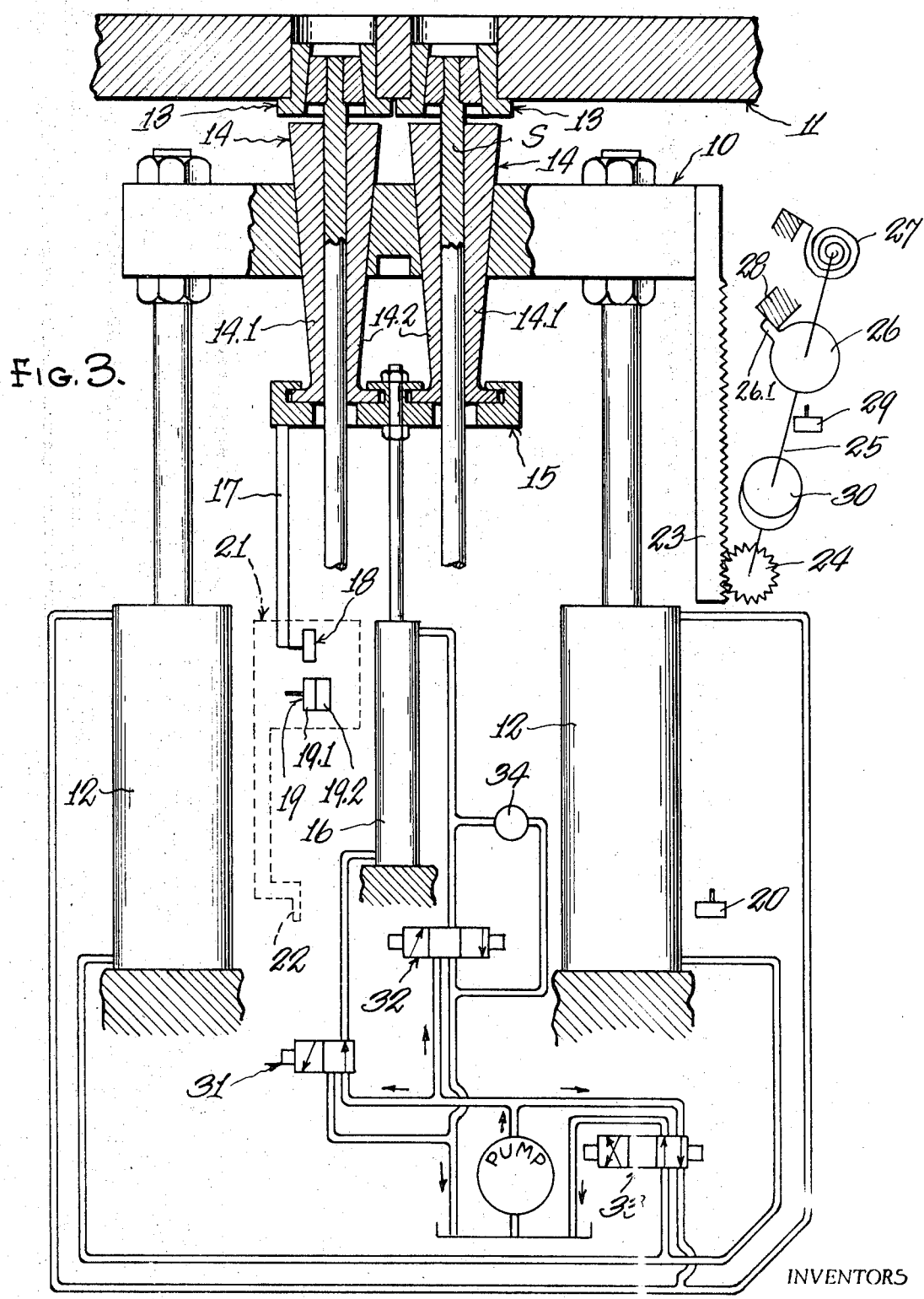

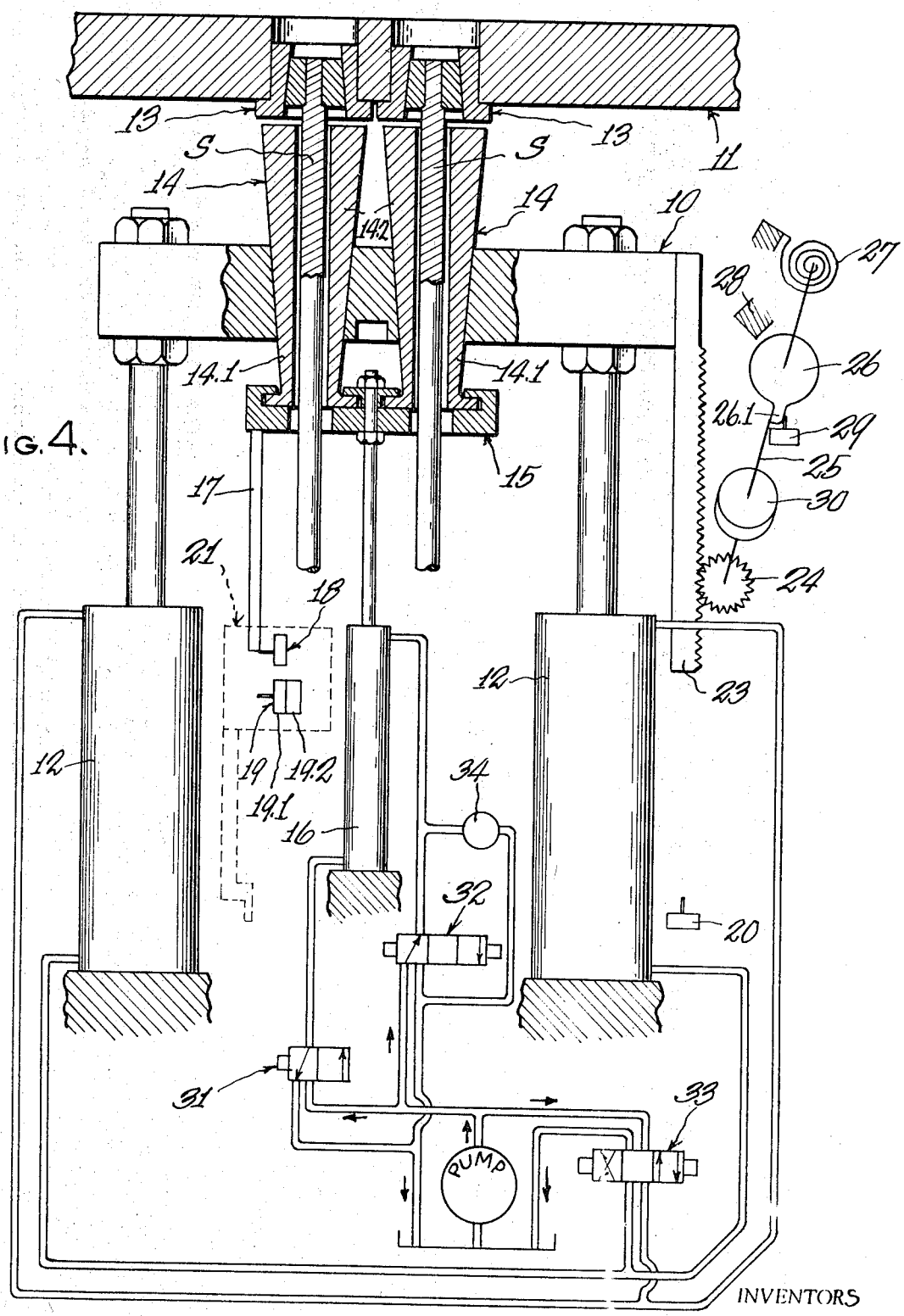

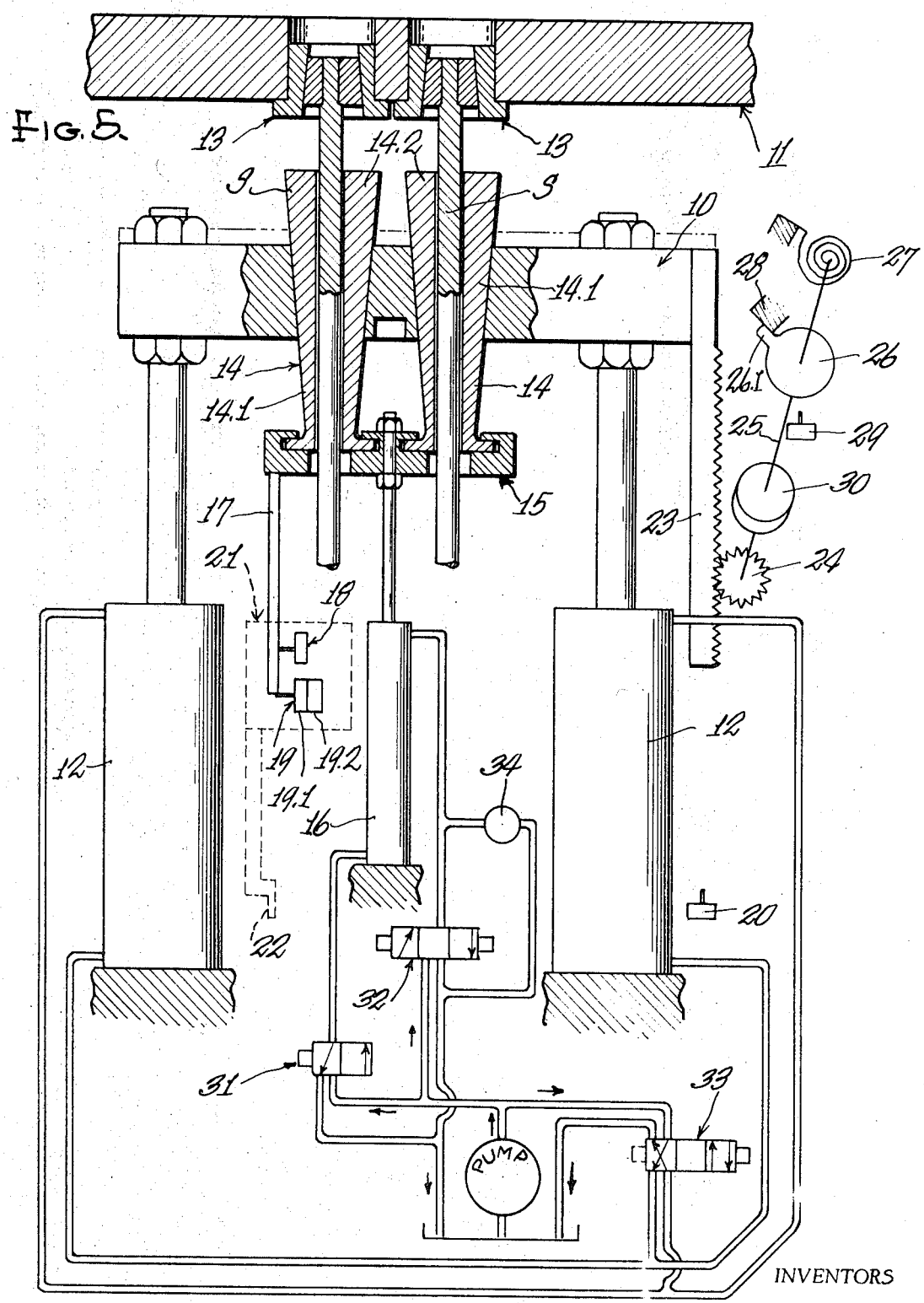

United States Patent Office 3,552,174
Patented Jan. 5, 1971

3,552,174
STOCK PUSHING APPARATUS AND METHOD
George David McGoogan, Youngstown, Paul Douglas Noble, Lowellville, Joseph Leonard Shultz, Warren, and Floyd William Diehl, Austintown, Ohio, assignors to The McKay Machine Company, Youngstown, Ohio
Filed Dec. 7, 1967, Ser. No. 688,910
Int. Cl. B21c 1/26
U.S. Cl. 72—284
4 Claims

ABSTRACT OF THE DISCLOSURE

Apparatus and method for pushing elongated stock longitudinally through a die and the like, which strongly resists stock passage therethrough, by gripping the stock between jaws and shifting the latter toward the die. The jaws are mounted on a carriage which is reciprocable along a predetermined path of travel toward and away from the die and such jaws are also reciprocable along the same travel path, but relative to the carriage, toward and away from stock gripping relation.

To minimize the length of stock at any one time subjected to longitudinal compression thus minimizing any tendency of the stock to buckle under such compression, a two-fold approach is employed: Firstly, the jaws are reciprocated by the carriage but a short distance in alternately gripping the stock and moving with the carriage toward the die to force the stock therethrough and releasing the stock and moving away from the die prior to regripping the stock and again forcing it through the die. Secondly, by novel mode of jaw release, each stock pushing stroke of the carriage terminates with the jaws virtually against the die. The novel mode of jaw release at the end of each stock pushing carriage stroke comprises holding the jaws against movement while the carriage is shifted away from the die. This results in relative movement between the carriage and the jaws to release the latter from stock gripping relation.

---

In virtually all operations where elongated stock is pulled or drawn through a die and the like, it is necessary to first push a sufficient length of stock through the die so that it may be gripped by the stock pulling device. To accomplish the foregoing, apparatus frequently known as a push pointer is used. Heretofore, problems have arisen in that prior-art push pointers are slow in operation and thus reduce production rates. Moreover, prior-art apparatus of this type required considerable operator attention and even so, the stock was frequently damaged when it buckled under the pushing force.

In contrast, the present invention provides push pointing, or stock pushing apparatus which cycles automatically without operator attention until its job is completed, which operates more rapidly than prior-art apparatus, and which virtually eliminates the possibility of buckling of the stock with attendant damage thereto. These and other advantages will readily become apparent from a study of the following description and from the appended drawings.

DESCRIPTION OF DRAWINGS

In the drawings accompanying this specification and forming a part of this application there is shown, for purpose of illustration, an embodiment which the invention may assume, and in these drawings:

FIG. 1 is a generally diagrammatic, fragmentary, top plan view of apparatus embodying the invention, parts on the near side being broken away to show underlying structure, and FIGS. 2 through 5 are views similar to FIG. 1 but showing certain parts in other operational positions.

DETAILED DESCRIPTION

Illustrated in FIG. 1 is push pointer apparatus having a carriage 10 reciprocable toward and away from a die stand 11 between the full line position of FIG. 1 and the position of FIG. 4 by means of hydraulic cylinders 12 whose piston rods are connected to the carriage. Although not shown, suitable guide structure of any conventional design will constrain carriage movement along a rectilinear path between the disclosed positions. As herein shown, the die stand 11 carries a pair of draw die assemblies 13, 13 in side-by-side relation through which respective elongated pieces of stock S, S are adapted to be pushed by the carriage 10 as will later be disclosed.

In order to selectively grip the stock, carriage 10 is provided with a pair of jaw assemblies 14 each formed of a pair of elongated jaws 14.1, 14.2 in opposed relation whose facing surfaces are suitably contoured to grip the stock. Jaw assemblies 14 have wedge engagement with the carriage whereby movement of the jaws relative to the carriage along the path of carriage movement in a direction toward the die stand opens the jaws to release their grip on the stock while movement of the jaws relative to the carriage in a direction away from the die stand closes the jaws to cause them to grip the stock.

To provide for relative movement aforesaid between the jaws and the carriage, the jaws are mounted on a cross-bar 15 and are movable therewith along the path of carriage movement toward and away from the die stand 11. The connection between the jaws and the bar, however, provides for movement of the jaws of each pair toward and away from each other to stock gripping and stock releasing positions respectively. Although not shown, suitable conventional structure may guide movement of the cross-bar 15 along the aforesaid path of carriage travel and a hydraulic cylinder 16 has its piston connected to the cross-bar to control movement thereof. For reasons to appear, cylinder 16 along the carriage cylinders 12 are appropriately anchored in position.

For controlling operation of cylinders 12, 12 and 16 in accordance with the position of the jaw asemblies 14 relative to the die stand 11 and through solenoid valves later to be disclosed, cross-bar 15 may carry a rod 17 with which the actuators of limit switches 18 and 19 are engageable. Switches 18 and 19 may be mounted in a housing 21 which may be adjusted by a crank or the like 22 toward and away from the die stand 11 to vary the position of these two switches relative to the die stand without affecting their positions relative to each other. Carried by and movable with the carriage 10 is a rack 23 and the free end of rack 23, in the position of parts seen in FIG. 1, is engaged with the actuator of a limit switch 20. A gear 24 is engaged with the rack 23 and drives a shaft 25 on which is mounted a cam 26. A torsion spring 27 yieldably rotates the shaft 25 to maintain lobe 26.1 of the cam 26 against a fixed stop 28. A limit switch 29 is suitably positioned for engagement of its actuator with the cam lobe 26.1 upon rotation of the cam in a counter-clockwise direction as will later appear. Interposed between the gear 24 and the shaft 25 is an electro-magnetic clutch 30 which, when engaged, causes the cam to rotate with the gear and when disengaged, allows the gear to rotate relative to the cam.

Turning now to the hydraulic circuitry for effecting operation of the previously mentioned carriage cylinders 12 and the jaw cylinder 16, a hydraulic pump draws hydraulic fluid from the reservoir shown and forces such fluid to a three-way, two-position, electro-magnetic valve 31, a three-way, three-position, electro-magnetic valve 32, and a four-way, three-position, electro-magnetic valve 33. Valve 31, it will be evident, selectively provides for admission of pressurized fluid to the blank end of jaw cylinder 16 or the return of fluid from such cylinder blank end to the pump. Valve 32 selectively provides for the same two functions to the rod end of jaw cylinder 16, however, in addition, valve 32 may also be positioned to block flow of fluid either to or from the rod end of cylinder 16. A pressure relief valve 34 is shunted around valve 32, as shown, for a purpose to appear. Valve 33 selectively provides for simultaneously feeding pressurized fluid to either the rod or blank ends of carriage cylinders 12 while returning fluid from the opposite ends of the cylinders to the sump. This valve also has a position wherein all fluid flow either to or from the carriage cylinders is blocked.

OPERATION

With the parts positioned as seen in full lines in FIG. 1, carriage 10 and the cross-bar 15 are in their full retracted positions and thus the jaws 14.1, 14.2 are wide open to receive the largest diameter stock within their operating range. At this position, the actuators of the limit switches 18, 19 are engaged with the rod 17, the actuator of limit switch 20 is engaged with the rack 23, while the actuator of limit switch 29 is free of engagement with the cam lobe 26.1 since the latter is being held against its stop by the spring 27 with the clutch 30 disengaged. The pieces of stock S may now be passed through the open jaw assemblies 14 until their forward ends abut respective die assemblies 13.

With the stock loaded as above described and assuming the pump is operating, an operator will initiate operation of the apparatus by pressing a suitable start button not shown. Valve 32, having previously been in the position seen in FIG. 1, will remain in such position to return fluid from the rod end of the jaw cylinder 16 to the sump. Valve 31 will be shifted to position to feed pressurized fluid to the blank end of jaw cylinder 16 to advance the jaw assemblies toward the die stand 11. Simultaneously with valve 31, valve 33 will be shifted from the position illustrated blocking fluid flow to or from carriage cylinders 12 to position wherein fluid is fed to the blank ends of the cylinders 12 and fluid from the rod ends thereof is discharged to the sump. With the valves thus positioned, the jaw assemblies and the carriage will advance together toward the die stand until the phantom line position is reached. During the movement aforesaid, no feeding of the stock will occur, of course, since the jaws are still wide open.

The phantom line position of the jaw assemblies represents the position of such jaws relative to the die stand at the beginning of the feed stroke and, upon arrival at such position, the rod 17 will, for example, allow normally open contacts of a portion 19.2 of switch 19 to open. The opening of these switch contacts will shift valve 31 to interrupt flow of pressurized fluid to the blank end of jaw cylinder 16 and to return fluid from such cylinder end to the sump. Simultaneously, valve 32 will be shifted to position blocking fluid flow to or from the rod end of the jaw cylinder and thus the jaw assemblies will be held in the phantom line position seen in FIG. 1.

With the jaw assemblies held in the phantom line position of FIG. 1, valve 33 will cause continued movement of carriage 10 toward the die stand until the position of FIG. 2 is reached. During movement of the carriage from the phantom line position of FIG. 1 to the position of FIG. 2 the wedge interengagement between the jaw assemblies and the carriage will cause the jaws to tightly grip the stock, bearing in mind that the jaws are restrained against movement with the carriage by the closed valve 32. Thus, the relative movement between the jaw assemblies and the carriage causes the jaws to grip the stock.

With the parts positioned as seen in FIG. 2; that is, with the stock tightly gripped by the jaws, continued relative movement aforesaid between the jaws and the carriage will be impossible and thus further movement of the carriage toward the die stand will carry the jaw assemblies therewith. This will follow since the force exerted by the relatively large carriage cylinders 12 is far in excess of that which could be resisted by the fluid trapped in the rod end of the relatively small jaw cylinder 16. In order to relieve excess fluid pressure developed at the rod end of jaw cylinder 16 during movement of the carriage from the position of FIG. 2 to that of FIG. 3, the pressure relief valve 34 will function to return fluid around the closed valve 32 and to the sump.

In moving from the position of FIG. 2 to the position of FIG. 3, the jaw assemblies, since they are in tight gripping relation with the stock, will force the latter into respective dies as shown. Upon completion of a stock feeding stroke as seen in FIG. 3; that is, with the forward ends of the jaw assemblies nearly touching but still spaced slightly from the die assemblies 13, rod 17 will operate switch 18 to, for example, open its normally closed contacts. It will be understood that switch 18 will previously have been positioned by shifting its housing 21 to cause actuation of this switch at the desired close spacing between the jaw assemblies and the die assemblies.

With the feeding stroke completed and the opening of the contacts of switch 18, a number of functions will take place substantially simultaneously: First, the function of the contacts of switch portion 19.2 will be abrogated and the function of the contact of switch portion 19.1 will be substituted therefor. Second, a counter, not shown, will be activated. Third, clutch 30 will be engaged. Fourth, valve 32 will momentarily be shifted from the closed position shown to a position wherein the rod end of jaw cylinder 16 is connected to the sump to bleed off the fluid pressure at such rod end and then the valve will be returned to the closed position shown. Fifth, the valve 31 will be shifted to feed fluid pressure to the blank end of jaw cylinder 16. Sixth, valve 33 will be shifted to the position shown wherein fluid pressure is fed to the rod ends of the carriage cylinders 12 while the fluid at the blank ends of these cylinders is returned to the sump.

With the parts positioned as above described, carriage 10 will be retracted to the position seen in FIG. 4; however, because of the fluid pressure at the blank end of jaw cylinder 16, the jaws will remain in their full forward positions and thus even infinitesimal withdrawal of the stock from the dies will be avoided. The relative movement between the carriage and the jaw assemblies will cause separation of jaws 14.1, 14.2 to release their grip on the stock. It is important to note that even though the blank end of cylinder 16 is exposed to fluid pressure and the jaws are released from the stock, little or no forward movement of the jaw assemblies will occur since fluid flow from the rod end of the cylinder is blocked by the closed valve 32 and the high-pressure setting of the pressure relief valve 34.

Bearing in mind that clutch 30 has been engaged during retraction of the carriage, when the latter reaches the position of FIG. 4, cam 26 will have been rotated sufficiently to cause its lobe 26.1 to shift the actuator of limit switch 29 to, for example, open its contacts. Actuation of cam switch 29 will shift the valve 33 from the position of FIG. 3 to the closed position seen in FIG. 4. This will block fluid flow to or from either end of carriage cylinders 12 thereby locking the carriage in the position of FIG. 4. In such position, the carriage is retracted slightly from the position seen in FIG. 2 for a purpose to appear. Valve 31 will be shifted from the position of FIG. 3 to that of FIG. 4 to return the fluid at the blank end of jaw cylinder 16 to the sump while valve 32 will be shifted from the closed position of FIG. 3 to the position of FIG. 4 wherein fluid pressure is fed to the rod end of the jaw cylinder 16 to retract the jaw assemblies to the position of FIG. 5.

Upon retraction of the jaw assemblies to the position of FIG. 5. rod 17 will operate switch portion 19.1 to, for example, open its normally closed contacts thus shifting valve 32 to the closed position shown blocking fluid flow either to or from the rod end of the jaw cylinder 16. In FIG. 5, the jaw assemblies are in the same position shown in FIG. 2; that is, positioned at the start of the stock feeding stroke. It is to be understood, however, that since the carriage is slightly retracted from the position of FIG. 2 as previously mentioned, the jaw assemblies have not yet gripped the stock.

Operation of switch portion 19.1, in addition to shifting valve 32, will disengage the clutch 30 and shift the valve 33 from the closed position of FIG. 4 to the position of FIG. 5 wherein fluid pressure is fed to blank ends of the carriage cylinders 12 and fluid at the rod ends of such cylinders is returned to the sump. With disengagement of clutch 30, torsion spring 27 will return the cam 26 to position wherein its lobe 26.1 abuts the stop 28. The shift aforesaid of valve 33 will cause the carriage to advance toward the die stand 11 once again.

With the jaws retained in the position of FIG. 5, advancement of the carriage to its phantom line position will cause the jaws to close upon and grip the stock and further carriage advancement will repeat the stock feeding stroke. The cycle of operations disclosed in FIGS. 2 through 5 will be repeated until, for example, the previously mentioned counter (not shown) signals that a sufficient number of feed strokes have taken place to feed a sufficient length of stock through the die assemblies.

After the final feeding stroke as signaled by the counter previously mentioned, the function of limit switch portion 19.1 will be abrogated and that of switch portion 19.2 will be substituted therefor once again. Accordingly, upon arrival of the parts to the position seen in FIG. 4, valve 33 will be held in the position of FIG. 3 so that retraction movement of the carriage will continue. Valve 32, however, will be shifted to return fluid at the rod end of jaw cylinder 16 to the sump while valve 31 will also be shifted to return fluid at the blank end of this cylinder to the sump. This will free the jaw assemblies for movement as will next appear. Continued retraction of carriage 10 will cause the carriage to abut the cross-bar 15 whereupon further retraction of the carriage will carry the jaw assemblies therewith. Retraction of the carriage and the jaw assemblies, the latter of which are now wide open, will continue until the rack 23 actuates limit switch 20 which will shift the valve 33 to closed position with the carriage and the jaw assemblies in the position seen in full lines in FIG. 1.

The usual draw carriage, not shown, may now engage the stock portions projecting beyond the die stand to draw the remaining lengths of stock through the dies. Thereafter, the complete cycle of operations hereinabove described may be repeated.

It will readily be apparent that the length of feeding stroke of the present appartus may be varied by varying the spacing between the limit switches 18, 19. When this is done, the position of switch 29 will also have to be varied correspondingly since during the stock feeding cycle, it is necessary to interrupt retracting movement of the carriage just beyond the point where the jaws close upon the stock with the jaws at the starting position for the stock feeding stroke. Furthermore, instead of physically varying the position of the switches 19 and 29, such switches could be duplicated at various appropriate locations and the desired pair of switches to be used could be selected as required.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:
1. Stock pushing apparatus in which a carriage is reciprocable along a predetermined path of travel and has stock gripping jaws reciprocable relative to said carriage along said line of travel toward and away from stock gripping relation and also movable with said carriage to cause movement of gripped stock with said carriage, the improvement comprising
   means for exerting forces respectively effecting advancement and retraction of said carriage along said line of travel,
   means for exerting a force on said jaws independently of that exerted on said carriage and in the direction of carriage advancement,
   said carriage and said jaws have wedged interengagement relatively arranged wherein movement of said carriage relative to said jaws in the direction of advancement causes said jaws to grip the stock a movement of said carriage relative to said jaws in the direction of retraction causes said jaws to release the stock,
   and means for controlling application of said forces to interrupt carriage advancement and movement therewith of said jaws and the gripped stock when said jaws reach a predetermined forward position, and to retain said jaws in such forward position during carriage retraction thereby releasing the stock from said jaws, said controlling means comprising a first portion responsive to the position of said jaws to interrupt carriage advancement and movement therewith of said jaws and the gripped stock when said jaws reach a predetermined forward position,
   a second portion for interrupting carriage retraction and being responsive solely to a predetermined amount of carriage retraction from the position of said carriage when its forward movement is interrupted by said first control means portion,
   and a third portion responsive to the position of said jaws to interrupt movement of said jaws in the direction of carriage retraction to a position just short of that which would cause said jaws to grip the stock,
   said controlling means being operable to once again advance said carriage following the aforesaid interruption of jaw movement in the direction of carriage retraction.
2. Stock pushing apparatus in which a carriage is reciprocable along a predetermined path of travel and has stock gripping jaws reciprocable relative to said carriage along said line of travel toward and away from stock gripping relation and also movable with said carriage to cause movement gripped stock with said carriage, the improvement comprising
   means for exerting forces respectively effecting advancement and retraction of said carriage along said line of travel,
   means for exerting a force on said jaws independently of that exerted on said carriage and in the direction of carriage advancement,
   said carriage and said jaws have wedged interengagement relatively arranged wherein movement of said carriage relative to said jaws in the direction of advancement causes said jaws to grip the stock and movement of said carriage relative to said jaws in the direction of retraction causes said jaws to release the stock,
   and means for controlling application of said forces to interrupt carriage advancement and movement therewith of said jaws and the gripped stock where said jaws reach a predetermined forward position, and to retain said jaws in such forward position during carriage retraction thereby releasing the stock from said jaws,
   and said controlling means further controlling application of said forces to interrupt carriage retraction upon disposition of said carriage at a predetermined rearward position, and thereafter effect movement of said jaws in the direction of carriage retraction just short of that which would cause said jaws to grip the stock, wherein said carriage and jaws are in position so that said carriage may be advanced while said jaws are yieldably retained in the position last mentioned.

3. In the operation of stock pushing apparatus in which a carriage is reciprocable along a predetermined line of travel and has stock gripping jaws reciprocable relative to said carriage along said line of travel toward and away from stock gripping relation, the method which comprises advancing said carriage, said jaws and the gripped stock along said line of travel until said jaws reach a predetermined forward position, retaining said jaws in said forward position and retracting said carriage along said line of travel to a predetermined rearward position thereby releasing said stock from said jaws, retaining said carriage in said rearward position and retracting said jaws an amount sufficiently less than carriage retraction to avoid gripping said stock, and advancing said carriage once again to dispose said jaws in said forward position while initially opposing jaw movement therewith, initial carriage movement causing said jaws to grip said stock and subsequent carriage movement advancing said jaws and the gripped stock.

4. The method of claim 3 which further comprises yieldably opposing movement of said jaws with said carriage in the direction of advance thereof.

References Cited

UNITED STATES PATENTS

| 2,880,854 | 4/1959 | Friedman | 72—284X |
| 1,298,999 | 4/1919 | Moltrup | 72—284 |

FOREIGN PATENTS

| 122,657 | 12/1944 | Australia | 72—284 |
| 567,662 | 2/1945 | Great Britain | 72—284 |
| 760,842 | 5/1955 | Great Britain | 72—284 |

CHARLES W. LANHAM, Primary Examiner

A. L. HAVIS, Assistant Examiner

U.S. Cl. X.R.

226—8; 74—110

PO-1050
(5/69)

UNITED STATES PATENT OFFICE
CERTIFICATE OF CORRECTION

Patent No. 3 552 174    Dated 5 January 1971

Inventor(s) George D. McGoogan, Paul D. Noble, Joseph L. Shultz and Floyd W. Diehl.

It is certified that error appears in the above-identified patent and that said Letters Patent are hereby corrected as shown below:

Column, 6, line 18, after stock "a" should be----and----

Line 51, after movement insert the missing word----of---

Line 68, "where" should be-----when-----.

Signed and sealed this 23rd day of March 1971.

(SEAL)
Attest:

EDWARD M. FLETCHER, JR.    WILLIAM E. SCHUYLER,
Attesting Officer       Commissioner of Patel